April 9, 1940.  J. J. DILKS, JR  2,196,629
PHOTOGRAPHIC PRINTING APPARATUS
Filed March 9, 1938  4 Sheets-Sheet 1
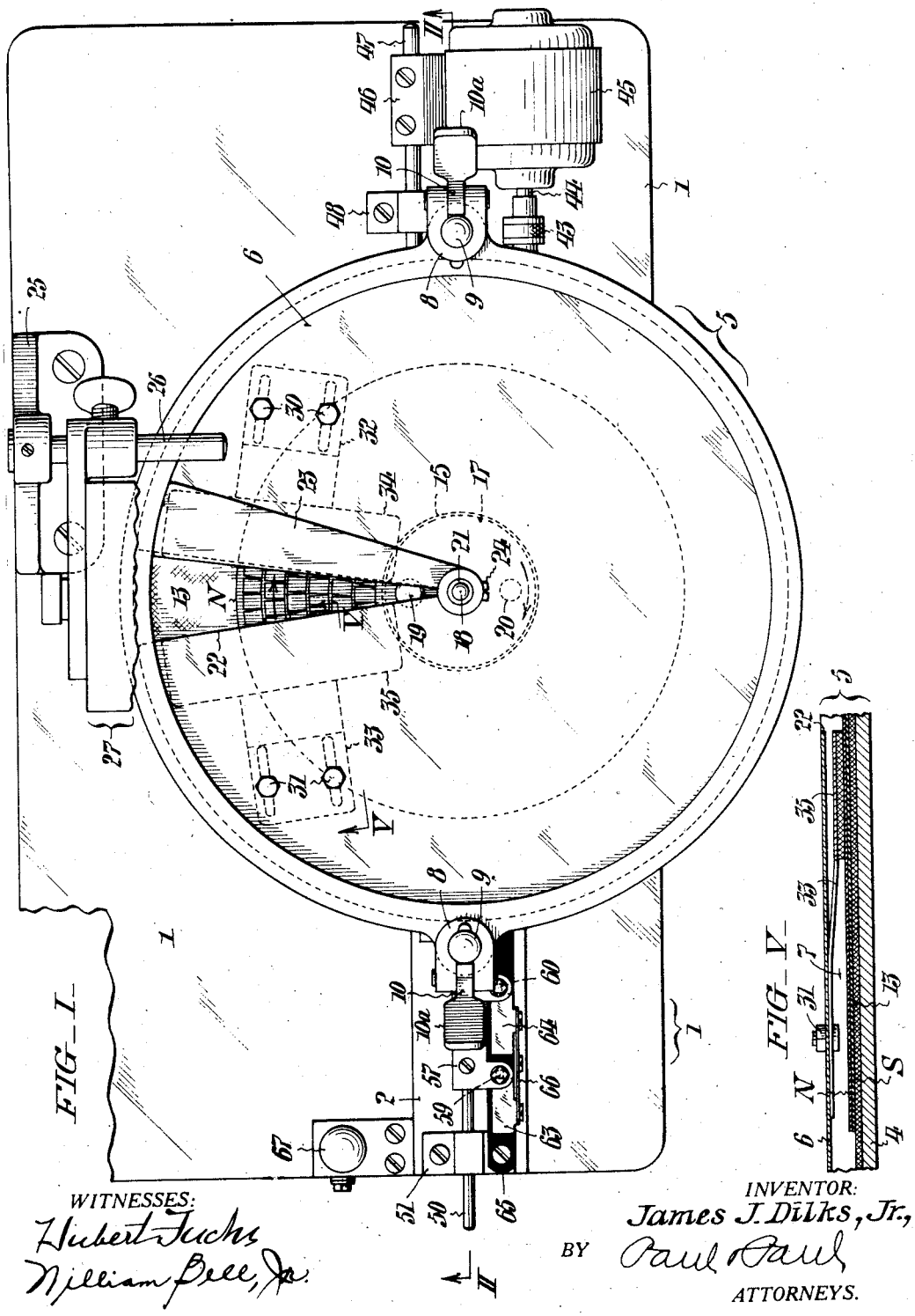
INVENTOR:
James J. Dilks, Jr.,
BY
ATTORNEYS.

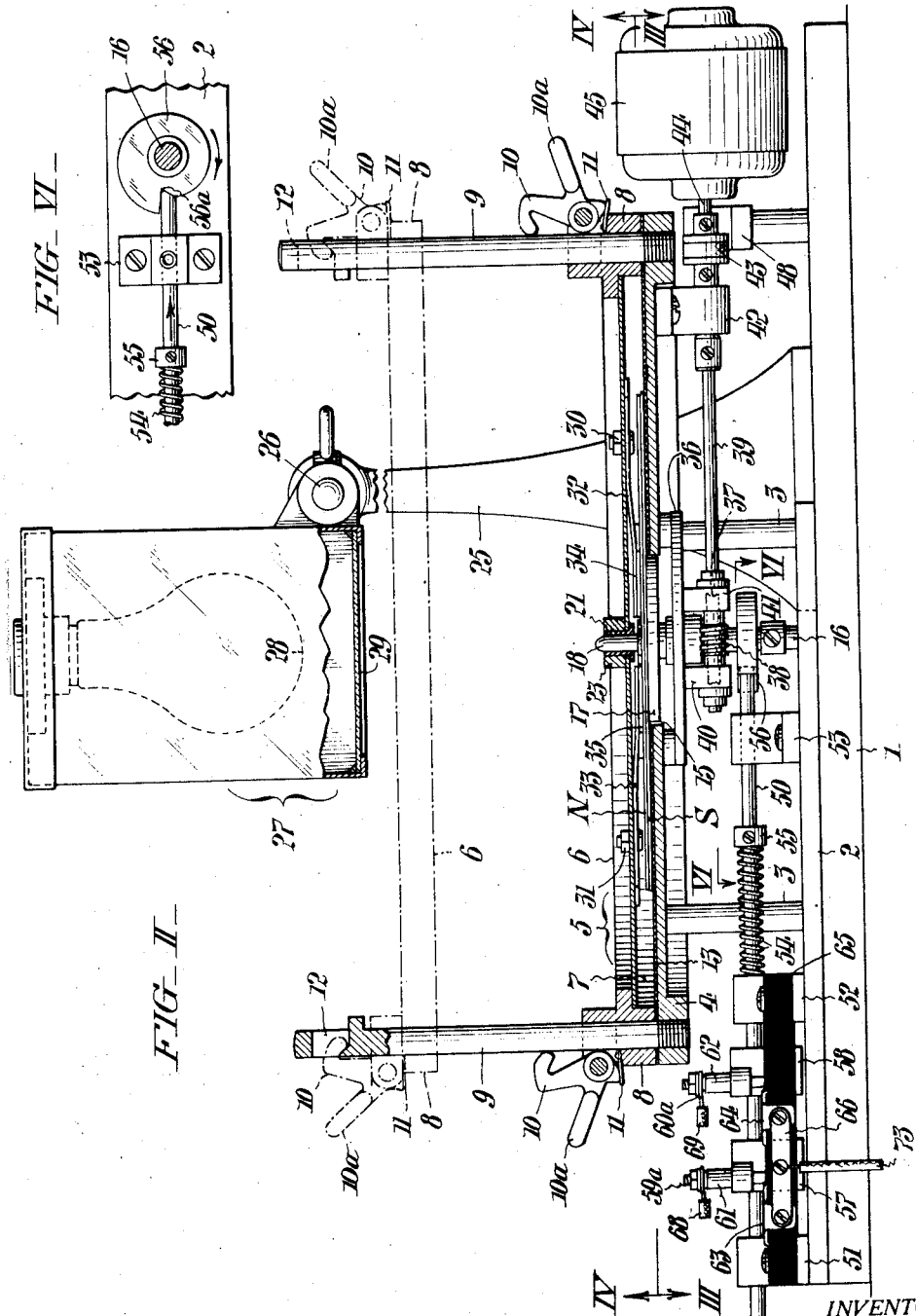

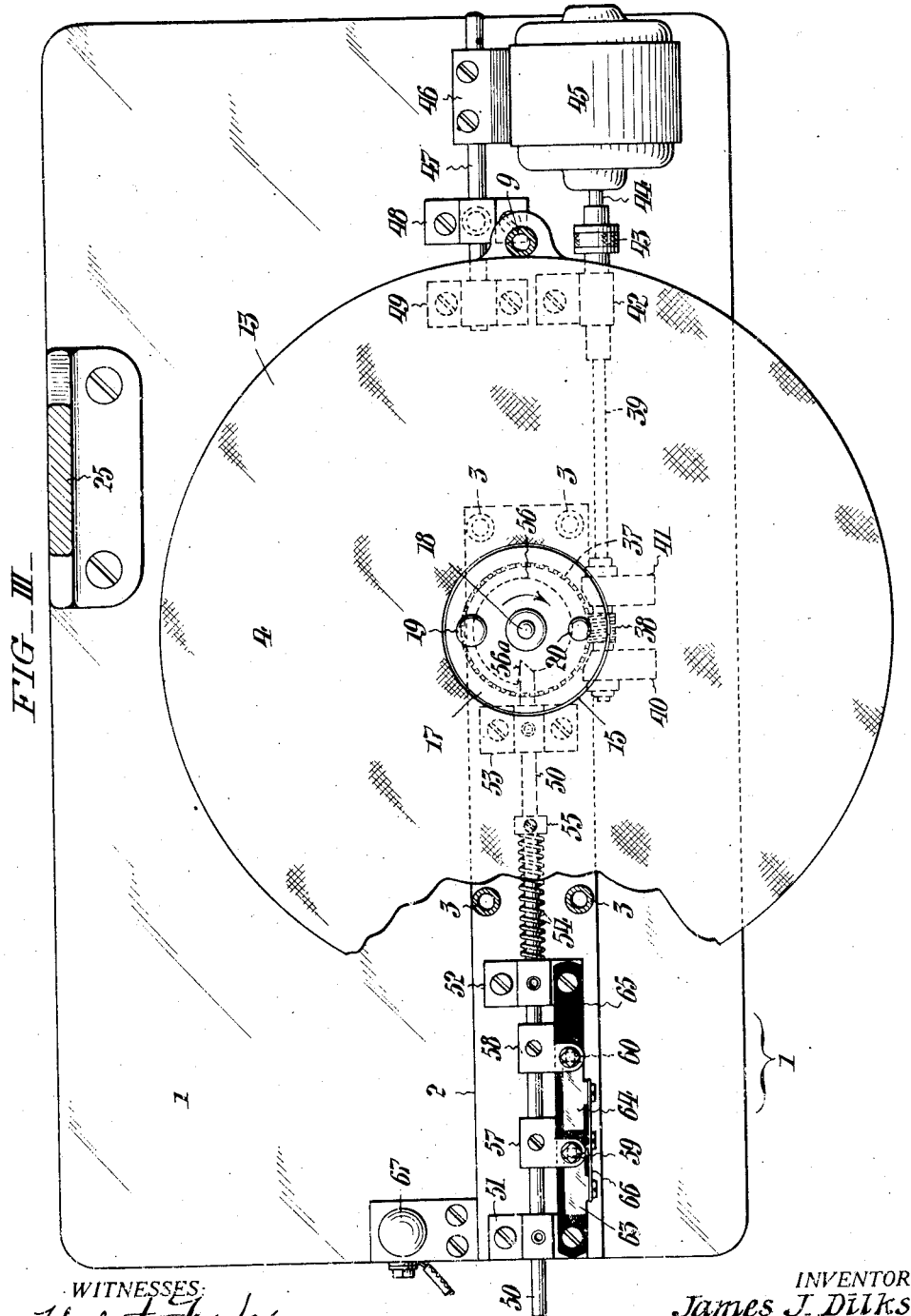

April 9, 1940.  J. J. DILKS, JR  2,196,629
PHOTOGRAPHIC PRINTING APPARATUS
Filed March 9, 1938  4 Sheets-Sheet 4
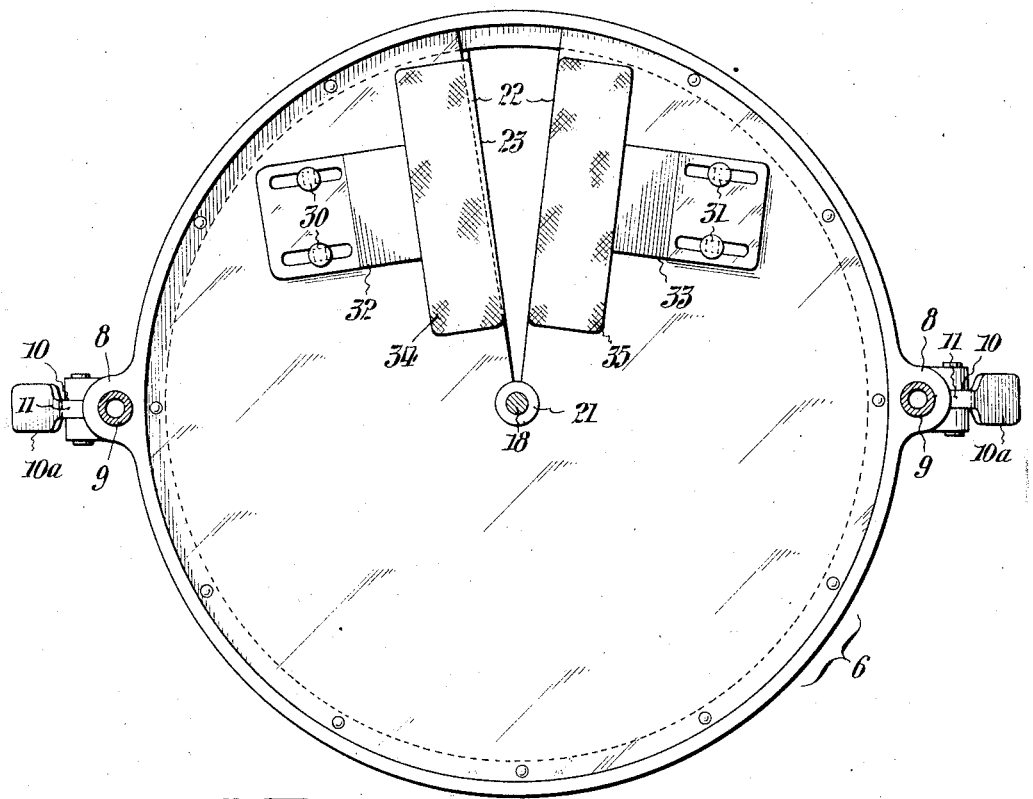
WITNESSES:
Hubert Fuchs
William Bell, Jr.
INVENTOR:
James J. Dilks, Jr.,
BY Paul & Paul
ATTORNEYS.

Patented Apr. 9, 1940

2,196,629

UNITED STATES PATENT OFFICE 2,196,629

PHOTOGRAPHIC PRINTING APPARATUS

James J. Dilks, Jr., Haddon Heights, N. J.

Application March 9, 1938, Serial No. 194,781

12 Claims. (Cl. 95—75)

This invention relates to photographic printing apparatus; and it is concerned more particularly with the production, from negative motion picture film disks of Celluloid or the like of "positives" of similar material for use in projectors of the kind disclosed in my co-pending patent applications Serial Nos. 170,129 and 188,157, filed by me on October 20, 1937, and February 1, 1938, respectively. In such film disks, the individual picture exposures or frames are extremely minute and serially arranged in a spiral which begins at the periphery of the disk and terminates within a small blank area at the disk center. In projection of the disks, the exposures or frames are magnified many times by the lens of the projector; and accordingly, for attainment of satisfactory results in the projection, each exposure must be not only free of blur but of "pin holes" as well. Attempts have been made heretofore to produce positives from negative disks of the kind referred to, by placing the negatives and the sensitized blanks beneath glass to hold them during exposure to light after the manner of ordinary photographic printing. Difficulty has however been experienced in securing a perfect product under this old method due on the one hand to the prismatic or "rainbowing" effect of the glass upon the light rays passing through it, and on the other hand to warpage in either or both disks which prevented direct contact between the whole of their areas at one time.

My invention has for its chief aim to overcome the difficulties supra, which desideratum I realize in practice by exposing to light but a narrow sectoral portion of a negative film disk and a positive film disk in axially superposed relation while turning them about a center coincident with their axes, and during the turning, maintaining the two disks in direct contact across the region of exposure only so that any unevenness due to warpage may distribute itself and be absorbed in the remaining portions of said discs.

Another aim of my invention is to make it possible to produce positive disk films economically and expeditiously under the above method which objective I attain as hereinafter more fully disclosed, through provision of a simple and inexpensive apparatus including a turn table whereon the sensitized blank film disk and the negative disk are mounted in the relation aforesaid, a housing enclosing the disks and having a narrow sectoral exposure slit in its top, a light source over the slit; means for rendering the casing light-tight along the edges of the sectoral slit while maintaining the disks in direct contact across the width of the slit and wiping the exposed face of the negative disk clean of dust; means for driving the mounting; means whereby the drive means may be set in motion and the light source activated; and automatic means whereby, after the lapse of a predetermined time interval, the drive means is stopped and the light source shut off.

Other objects and attendant advantages will appear from the following detailed description of the attached drawings, wherein Fig. I shows in top plan a disk film printing apparatus conveniently embodying my invention, portions thereof being broken away to facilitate showing of important underlying parts which would otherwise be concealed.

Fig. II is a vertical sectional view of the apparatus taken as indicated by the arrows II—II in Fig. I.

Fig. III is a horizontal sectional view taken as indicated by the arrows III—III in Fig. II.

Fig. IV is a horizontal sectional view taken as indicated by the arrows IV—IV in Fig. II.

Fig. V is a fragmentary detail sectional view on a larger scale taken as indicated by the arrows V—V in Fig. I.

Fig. VI is a detail sectional view taken as indicated by the arrows VI—VI in Fig. II; and Fig. VII is a diagram of the wiring connections for various electrical devices employed in the apparatus.

As herein illustrated, the photographic printing apparatus of my invention has an oblong bed I which may be of wood, and to the top of which is secured near its front edge, a longitudinally-extending metallic plate 2. Sustained at an elevation above the bed I by four posts 3 upstanding from the plate 2 is the bottom 4 of a shallow circular box-like casing 5 whereof the cover 6 is upwardly recessed to form, with said bottom component, a chamber 7 for reception of a sensitized blank disk S and a negative film disk N, the latter superimposed upon the first. At diametrically opposite points, the cover 6 of the casing 5 is formed with ears 8 which slidably engage guide posts 9 on the bottom 4. The cover component 6 can thus be lifted as shown in dot and dash lines in Fig. II, to a level well above the bottom of the casing for convenience of placing and removing the film disks S and N. In order to hold the cover 6 in elevated position, I have provided it with pivoted dogs or latches 10 which are urged inwardly by springs shown at 11 and which, as said cover is raised, automatically engage slots 12 in the posts 9. By pressing down upon integrally formed grasp projections 10a on the latches 10, the latter may be withdrawn from the slots 12 in the posts 9 when the cover 6 is to be lowered. The bottom 4 of the casing 5 has a facing 13 of plush or other textile fabric on its upper surface against the peripheral margin of which the pendant circumferential flange of the cover 6 seals light-tight. Disposed in an axial opening 15 in the bottom 4 of the casing 5 with its upper surface flush with the textile facing 13, and secured to a vertical shaft 16, is a circular turn table 17 which serves as a rotary mounting for the film disks N and S. As shown in Figs. II and III, the turn table 17 has an upwardly projecting round-ended axial stud 18 and a pair of diametrically-arranged upstanding studs 19 and 20 of different diameters which are adapted to be engaged by corresponding apertures in the film disks N and S. In actual practice, the apertures in the negative disk N are pre-allocated with relation to the point of starting of serially-arranged pictures or frames thereon so that the same relationship will be predetermined in the positive disks printed from such negative. The stud 18, it will be noted from Fig. III, is quite high, so as to be engaged by an apertured upstanding boss 21 at the center of the cover 6 of the casing 5 when said cover is lowered.

As shown in Fig. I, the cover of the casing 5 has a narrow radially-arranged slit 22 of sectoral configuration through which corresponding areas of the film disks N and S are exposed. The exposure slit 22 is regulatable by a vane 23 which is fulcrumed for adjustment about the upwardly-projecting portion of the central bushing 21 in the cover 6, and which is fixable in adjusted positions by a set screw shown at 24.

Rising from the bed 1 is a bracket 25 with a forwardly projecting horizontal rod 26 at its top, whereon a light housing 27 is supported with capacity for adjustment above the sectoral slit 22. Within the housing 27 is a source of illumination, here shown in the form of an incandescent electric bulb 28 whereof the actinic rays are diffused by a frosted glass 29 forming the bottom of said housing. Secured to the bottom face of the cover 6 of the enclosure at opposite sides of the sectoral slit 22 with capacity for lateral adjustment individually by screws 30, 31, are spring fingers 32, 33 which, at their free ends, carry pads 34, 35 of plush or the like (Figs. IV and V). Under the springiness of fingers 32, 33, the pads 34, 35 are yieldingly maintained in light but firm pressure contact with the negative film disk N from above and thus cooperate with the textile facing 13 on the bottom component of the casing on which the sensitized disk S rests to positively maintain said disks in direct contact with each other across the region of the exposure opening 22. The pads moreover act as wipers to restrain dust particles on the top surface of the negative disk N and thereby prevent them from reaching the exposure opening and thus preclude the formation of "pin holes" in the disk being printed.

The vertical shaft 16 of the mounting 17 is journaled at its upper end in a circular bearing plate 36 (Fig. II) suspended from the bottom of the casing 5, and at its lower end is journaled in the plate 2 hereinbefore referred to.

For the purpose of rotating the mounting 17, I have provided means including a worm gear couple whereof the wheel 37 is affixed to the vertical shaft 16 immediately below the bearing plate 36, and whereof the worm 38 is secured to a horizontal shaft 39. As shown the shaft 39 is journaled in pendant bearings 40, 41 and 42 respectively on the plate 36, and on the casing bottom 4, and directly connected by a friction coupling 43 with the shaft 44 of an electric motor 45. As shown in Fig. III, the motor 45 is supported by a bracket 46 which is adjustable along a horizontal rod 47 fixed in an upstanding bracket 48 on the bed 1 and in a pendant bracket 49 on the casing bottom 4.

In order to control current flow to the lamp 28 and to the motor 45 in a manner later on explained, I have provided a switch mechanism including a rod 50 which is guided for endwise movement in fixed guides 51, 52 and 53 on the plate 2. By means of a helical spring 54 in compression between the bracket 52 and a collar 55 on the rod 50, the beveled inner end of said rod is maintained in yielding contact with a spiral cam 56 on the vertical shaft 16 of the disk mounting 17. Adjustably secured to the rod 50 in spaced relation in the interval between the two guides 51, 52 is a pair of holders 57, 58 respectively for brush contacts 59, 60. As shown in Fig. VII, the brush contacts 59, 60 are spring pressed downwardly and guided in tubular insulate bushings 61, 62 fixed in the holders 57, 58. As the rod 50 is shifted leftward in Fig. III under the action of the cam 56, the brushes 59 and 60 are caused to override plate contacts 63, 64 at the top of an insulate bar 65 which is secured at its opposite ends to the guides 51 and 52. As further shown in Figs. II, III and VII, the two plate contacts 63, 64 are electrically connected by a metallic bridge piece 66. The control means also includes a starter push button shown at 67 in Fig. III.

It is to be particularly noted from Fig. VII that the spacing of the movable brushes 59 and 60 is slightly greater than that of the fixed contact plates 63 and 64, as a result of which when the apparatus is at rest, the brush 60 is slightly closer to the plate 64 than the brush 59 is to the plate 63. The reason for this will become apparent later on from the description of operation of the apparatus.

Still referring to Fig. VII, the terminal 59a of the movable contact 59 is connected by a conductor 68 with one terminal of the incandescent lamp 28, and the terminal 60a of the movable contact 60, by a conductor 69 with the corresponding terminal of the motor 45. The other terminals of the lamp 28 and the motor 45 are directly connected to a conductor 70 leading from a plug 71 which may be inserted into a wall socket of a power supply circuit. Another conductor 72 leads from the plug 71 to one terminal of the push button 67 and has a branch 73 which extends to the bar 66 connecting the two plate contacts 63, 64. Still another conductor 74 extends from the other terminal of the push button 67 and connects with the conductor 69.

The operation of the apparatus is as follows: Let it be assumed that a sensitized blank disk S and a negative disk N have been placed on the bottom component of the casing 5 in the manner already explained, and that the cover 6 has been lowered over them as shown in Figs. I and II. With this preparation, the push button 67 is depressed and current flow established through the motor 45 by way of the conductors 70, 69, 74 and 72. Immediately as the turn table 17 begins to rotate in the direction of the arrow in Fig. 1, the beveled end of the rod 50 is pushed out of the notch 56a of the cam 56 and said rod thereby moved leftward. As a consequence of the spacing of the brushes 59 and 60 as hereinbefore explained, the brush 60 first contacts the plate 64 with the result that a circuit is closed through the motor 45 by way of the conductors 70, 69, 73 and 72. An instant after starting of the motor 45, the brush 59 contacts the plate 63 with attendant closing of a circuit through the lamp 28 by way of the conductors 70, 68, 73 and 72. The motor 45 is thereby given the opportunity to overcome its inertia and get into motion and begin turning the film disks N and S just as the light 28 is flashed on. Upon release of the push button 67, the circuits through the lamp 28 and the motor 45 are maintained closed as the brushes 59 and 60 are advanced leftward in Fig. VII over the plates 63 and 64 under the influence of the rotary cam 56. With the motor 45 now running, the disks N and S are turned at a constant speed incident to which, under the downward pressure of the wipers 34, 35, the two disks are maintained in positive contact across the exposure opening 22 in the cover 6 of the casing 5, said wipers also functioning all the while to maintain a light-tight seal at the edges of the opening and to clean the top surface of the negative disk N. Finally upon completion of a single rotation of the turn table shaft 16, the rod will be shifted rightward in Fig. III by the spring 54 as its beveled end drops from the high point of the rotary cam 56 into the notch 56a of the latter. During this retraction of the rod 50, the brush 59 will leave the contact plate 63 before the brush 60 leaves the contact plate 64 so that shutting off of the light 28 occurs just prior to stoppage of the motor. In this way it will be seen that I insure even exposure of all portions of the film disks to the light and thus obtain positives which are clear and sharp and devoid of imperfections or blemishes such as pin holes.

Having thus described my invention, what I claim:

1. Apparatus for printing photographic film disks of Celluloid or the like, comprising a turn table for supporting a negative film disk and a sensitized film disk one directly superimposed upon the other in axial relation, a stationarily supported light tight casing enclosing the disks and having a sectoral exposure slit in its top, means for holding the disk in pressure contact at the exposure slit, a light source over the sectoral slit, and means for driving the turn table to move the films past the sectoral slit.

2. Photographic printing apparatus according to claim 1, including means whereby the width of the sectoral slit may be varied.

3. Photographic printing apparatus according to claim 1, wherein the casing has a cover which is retractable for convenience of placing the disks on the turn table and of removing them therefrom after printing.

4. Photographic printing apparatus according to claim 1, wherein the turn table has an axial stud and a pair of diametrically-arranged studs of different diameters for engaging corresponding pre-allocated holes in the disks.

5. Photographic printing apparatus according to claim 1, wherein the turn table is in the form of a circular plate corresponding in diameter to a blank central area of the negative film disk; and wherein the top of the turn table is flush with a textile disk-supporting facing on the bottom component of the casing.

6. Apparatus, according to claim 1, for printing photographic film disks, in which the pressure holding means includes spring wipers with pads of soft compressible material that bear upon the disks at the edges of the exposure opening.

7. Apparatus, according to claim 1, for printing photographic film disks, in which the pressure holding means includes spring wipers with pads of soft compressible material that bear upon the disks at the edges of the exposure opening, and in which means is included for adjusting the wipers laterally of the slit, and also means for adjusting the width of the slit.

8. Apparatus, according to claim 1, for printing photographic film disks, including means for starting the drive means and activating the light source, and automatic means for stopping the drive means and shutting off the light source upon completion of a single rotation of the disks.

9. Apparatus, according to claim 1, for printing photographic film disks, in which the light source has the form of an electric lamp and the drive means the form of an electric motor, and in which there is included a manual switch in circuit with the lamp and the motor for starting the apparatus; and automatic switch means for opening the circuit through the light and the motor upon completion of a single rotation of the disks.

10. Apparatus, according to claim 1, for printing photographic film disks, in which the light source has the form of an electric lamp, and the drive means the form of an electric motor, and in which there is included a manual switch-in circuit with the lamp and the motor for starting the apparatus; and a switch automatically operated from the axis of the turntable for opening the circuit through the lamp and the motor upon completion of the rotation of the disk.

11. Apparatus, according to claim 1, for printing photographic film disks, in which the light source has the form of an electric lamp and the driving means the form of an electric motor, and in which there is included a manual switch-in circuit with the lamp and the motor for starting the apparatus; and automatic switch means for opening the circuit through the lamp and the motor upon completion of a single rotation of the disks, said automatic switch means comprising a pair of sliding contacts respectively in circuit with one terminal of the lamp and with one terminal of the motor, a pair of fixed contacts adapted to be reciprocatively over-traveled by the sliding contacts during the usual rotation of the turntable and a conductor constituting a common connection between the fixed contacts and the other terminals of the lamp and the motor.

12. Apparatus, according to claim 1, for printing photographic film disks, in which the light source has the form of an electric lamp and the driving means the form of an electric motor, and in which there is included a manual switch-in circuit with the lamp and the motor for starting the apparatus; and automatic switch means for opening the circuit through the lamp and the motor upon completion of a single rotation of the disks, said automatic switch means comprising a pair of sliding contacts respectively in circuit with one terminal of the lamp and with one terminal of the motor, a pair of fixed contacts, a conductor constituting a common connection between the fixed contacts and the other terminals of the lamp and motor, a support for the sliding contacts, means for reciprocating the support once for each rotation of the turntable whereby the movable contacts are caused to over travel the fixed contacts, said movable and fixed contacts being differently spaced relatively so that, at starting, the circuit through the motor is closed somewhat prior to the closing of the lamp circuit, and at the completion of each printing circle, the circuit through the motor is open somewhat prior to the opening of the lamp circuit.

JAMES J. DILKS, Jr.